United States Patent [19]

Takagi et al.

[11] Patent Number: 5,160,615
[45] Date of Patent: Nov. 3, 1992

[54] HOLLOW FIBER TYPE LIQUID PROCESSING APPARATUS

[75] Inventors: Toshiaki Takagi; Hiromi Deguchi, both of Fujinomiya, Japan

[73] Assignee: Terumo Kabushiki Kaisha, Tokyo, Japan

[21] Appl. No.: 687,718

[22] Filed: Apr. 18, 1991

[30] Foreign Application Priority Data

Apr. 18, 1990 [JP] Japan .................................. 2-102464
Apr. 19, 1990 [JP] Japan .................................. 2-103944

[51] Int. Cl.$^5$ .............................................. B01D 63/02
[52] U.S. Cl. ............................ 210/321.8; 210/321.81; 210/450; 210/500.23; 422/48
[58] Field of Search ............. 210/195.2, 321.79, 321.8, 210/321.81, 450, 500.23; 422/45, 46, 48; 264/261

[56] References Cited

U.S. PATENT DOCUMENTS

| | | |
|---|---|---|
| 2,995,057 | 8/1961 | Nenzell . |
| 3,882,024 | 5/1975 | Holmes ............................ 210/321.8 |
| 4,242,203 | 12/1980 | Amicel et al. .................. 210/321.81 |
| 4,283,284 | 8/1981 | Schnell .............................. 210/321.8 |
| 4,688,752 | 8/1987 | Barteck et al. ......................... 249/85 |
| 4,708,796 | 11/1987 | Yoshimoto et al. ............. 210/321.8 |
| 4,781,889 | 11/1988 | Fukasawa et al. ............... 210/321.8 |
| 4,948,560 | 8/1990 | Deguchi et al. ................. 210/321.8 |
| 4,966,699 | 10/1990 | Sasaki et al. ..................... 210/321.8 |
| 4,980,060 | 12/1990 | Muto et al. ....................... 210/321.8 |
| 4,990,251 | 2/1991 | Spranger et al. ................ 210/321.8 |
| 5,058,661 | 10/1991 | Oshiyama ............................. 422/46 |

OTHER PUBLICATIONS

Research Disclosure, No. 225, Jan. 1983, p. 9, Havant, Hampshire, GB; "Hollow fiber dialyzer".

Primary Examiner—Mary Lynn Theisen
Assistant Examiner—Sun Uk Kim
Attorney, Agent, or Firm—Frishauf, Holtz, Goodman & Woodward

[57] ABSTRACT

The hollow fiber type blood processing apparatus of the present invention comprises a housing, a bundle of hollow fibers which consists of a great number of hollow fibers for processing blood and is housed in the housing, an inlet and an outlet of a blood processing liquid which are provided near each end of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the two blood ports have each an annular groove at the peripheral area of their inside surface and an annular elastic member conjoined in the annular groove by molding, the annular elastic members have each an annular elastic rib extended out of the annular groove, and the blood ports are attached to the housing with their annular elastic member pressed to the corresponding partition and the annular elastic rib of the annular elastic member pinched between the partition and the annular rib which defines the radially inner side of the annular groove of each blood port.

16 Claims, 11 Drawing Sheets

HOLLOW FIBER TYPE LIQUID PROCESSING APPARATUS

BACKGROUND OF THE INVENTION

This invention relates to the hollow fiber type liquid processing apparatus utilized for a hollow fiber type of artificial dialyzer, artificial lung, blood plasma separator, and the like.

Presently, many hollow fiber type liquid processing apparatus are widely used. The typical application is a hollow fiber type artificial dialyzer. The general construction of this type of artificial dialyzer is such that a bundle of many hollow fibers each made of a dialyzation membrane is housed in a cylindrical housing provided with an inlet and an outlet of dialyzation liquid, both end of the hollow fiber bundle are retained in a liquid-tight fashion by partitions made of a potting agent and secured to each end of the housing, and cap-like blood ports provided respectively with a blood inlet and a blood outlet are attached to the ends of the housing. For the dialyzation membrane, hydrophilic membranes of regenerated cellulose such as cellulose acetate and cuprammonium cellulose are used. For the potting agent, polyuretane and others are used.

The blood ports used in the existing blood dialyzers have generally a blood inlet or outlet and an annular groove. They are attached to the ends of the housing by means of threaded joints with an O-ring made of silicone rubber or a like material in the annular groove.

With such blood ports, leak of blood sometimes occurs due to incomplete insertion or dislocation of the O-ring during the fabrication process.

To solve such problems, there is proposed a hollow fiber type material transfer apparatus in U.S. Pat. No. 4,708,796. In this apparatus, as shown in FIG. 14, cap-like blood ports 50 provided with an annular elastic member 54 conjoined to the inside surface of the blood port by molding are directly attached to the housing without using fastening rings and thus solves the above problems.

However, there are following problems with this apparatus. Since the top end of the annular elastic member 54 (surface to contact with the partition) is flat and too wide, it can happen that the annular elastic member and the partition are not sealed completely liquid-tight and blood leaks between the annular elastic member and the partition or between the annular elastic member and the entrance blood port. Moreover, when first molding the annular elastic member 54 and then injection molding the blood port 50, burrs of the material used for the blood port are prone to grow at the area indicated by 58. On the other hand, when first molding the blood port 50 and then injection molding the annular elastic member 54, burrs of the material used for the annular elastic member are prone to grow at the area indicated by 56. These burrs come into contact with the circulated blood and can cause blood clots. Further, fine pieces of broken burrs can enter the blood and flow into the patient body.

Furthermore, with the conventional hollow fiber type liquid processing apparatus, the blood ports with the same inside shape are used for the entrance and exit blood ports through they are marked so by different colors. Because of this inside shape of the blood ports, there is a problem that coagulation of blood can occur while passing through the inside of dialyzer.

SUMMARY OF INVENTION

An object of the present invention is to solve the problems of the conventional apparatus as described above and provide an improved blood processing apparatus which can seal the blood ports and the partitions liquid-tight securely without using O-rings.

Another object of the present invention is to solve the above problems of the conventional apparatus and provide an improved blood processing apparatus which can seal the blood ports and the partitions liquid-tight securely without O-rings, prevent occurrence of coagulation of circulating blood, formation of blood clots caused by contact with burrs and mixing of broken burrs into the blood.

Further object of the present invention is to solve the problems of the conventional apparatus as described above and provide an improved blood processing apparatus which can substantially equally distribute blood to all the hollow fibers and decrease coagulation of blood.

The above first object is attained by a hollow fiber type blood processing apparatus of the present invention comprises a housing, a bundle of hollow fibers which comprises a great number of hollow fibers for processing blood and is housed in the housing, an inlet and an outlet of a blood processing liquid which are provided near each end of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the entrance blood port and exit blood port have each an annular groove at the peripheral area of their inside surface and an annular elastic member conjoined in the annular groove by molding, the annular elastic members have each an annular elastic rib extended out of the annular groove, and the entrance blood port and the exit blood port are attached to the housing with their annular elastic member pressed to the corresponding partition and the annular elastic rib of the annular elastic member pinched between the partition and an annular rib which defines the radially-inner side of the annular groove of each blood port.

The second object is attained by a hollow fiber type liquid processing apparatus of the present invention comprises the housing, a bundle of hollow fibers which comprises a great number of hollow fibers for processing blood and is housed in the housing, an inlet and an outlet for a blood processing liquid which are provided near each ends of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the entrance blood port and the exit blood port have each an annular groove at the peripheral area of their inside surface and an annular elastic member secured in each annular groove, and an annular hollow space formed between the annular elastic member and an annular rib which defines the radially-inner side of the annular groove in the inside surface of each blood port and the entrance blood port and the exit blood port are attached to the housing with their annular elastic member pressed to the corresponding partition.

The third object is attained by a hollow fiber type liquid processing apparatus of the present invention comprises the housing, a bundle of hollow fibers which comprises a great number of hollow fibers for processing blood and is housed in the housing, an inlet and an outlet for a blood processing liquid which are provided near each ends of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the entrance blood port and the exit blood port have different inside shape.

DETAILED DESCRIPTION OF THE PREFERRED EMBODIMENTS

A hollow fiber type liquid processing apparatus of the present invention is described using the embodiments shown in drawings.

Figure 1:
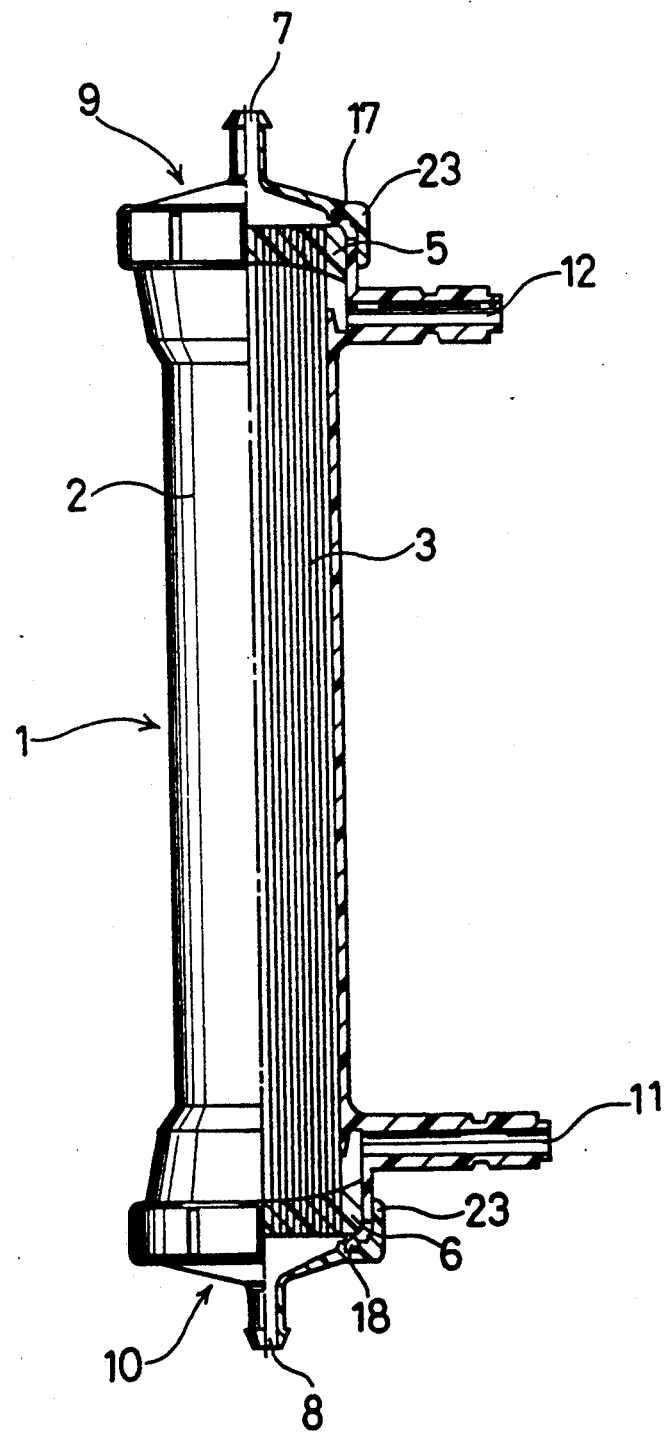
FIG. 1 is a part-sectional view of a hollow fiber type blood processing apparatus of an embodiment of the present invention.
Figure 2:
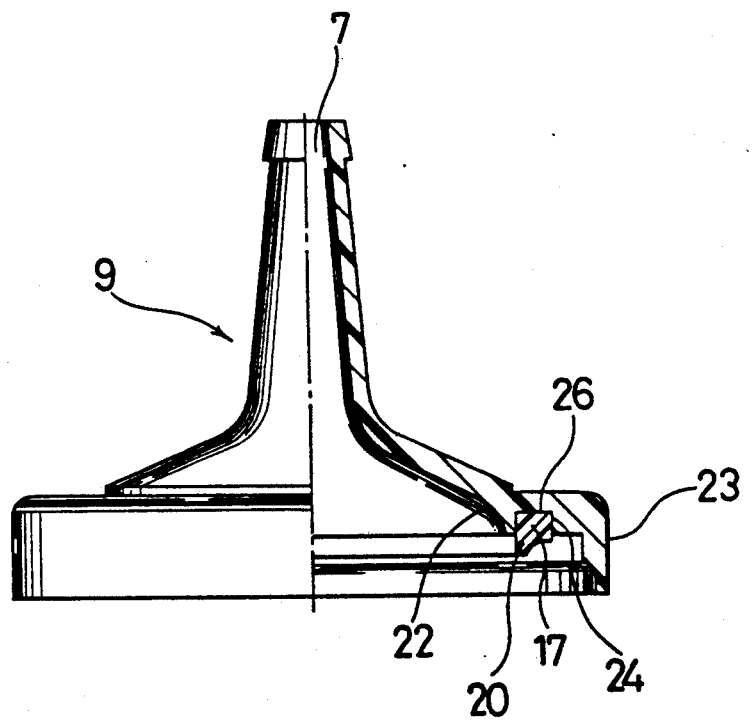
FIG. 2 is an enlarged part-sectional view of a part of the blood port used in the hollow fiber type blood processing apparatus of an embodiment of the present invention.

FIG. 1 is a part-sectional view of an embodiment of the hollow fiber type liquid processing apparatus of the present invention applied to an artificial dialyzer. FIG. 2 is an enlarged scale sectional view of the blood ports used in the artificial dialyzer shown in FIG. 1.

A hollow fiber type liquid processing apparatus 1 comprises a housing 2, a bundle of hollow fibers 3 which comprises a great number of hollow fibers for processing blood and is housed in the housing 2, an inlet 11 and an outlet 12 of a blood processing liquid provided near each end of the housing 2, partitions 5 and 6 disposed at each end of the housing 2 and retaining each end of the bundle of hollow fibers 3, an entrance blood port 9 having a blood inlet 7 and attached to the end of the housing 2 on the side of the partitions 5, an exit blood port 10 having a blood outlet 8 and attached to the end of the housing 2 on the side of the partitions 6. The blood ports 9 and 10 each have a annular groove 26 formed in their inside surface near the circumference and an annular elastic member 17, 18 put in the annular groove 26. The annular elastic members 17 and 18 have an annular elastic rib 20 protruding out of the annular groove 26. The blood ports 9 and 10 are secured to the housing 2 in a manner that the annular elastic members 17 and 18 are pressed to the portions 5 and 6. The annular elastic rib 20 of the annular elastic members 7 and 8 is pinched between each partition 5, 6 and an annular rib 22 which defines the inner side of the annular groove 26 of each blood port 9 and 10.

Figure 3:
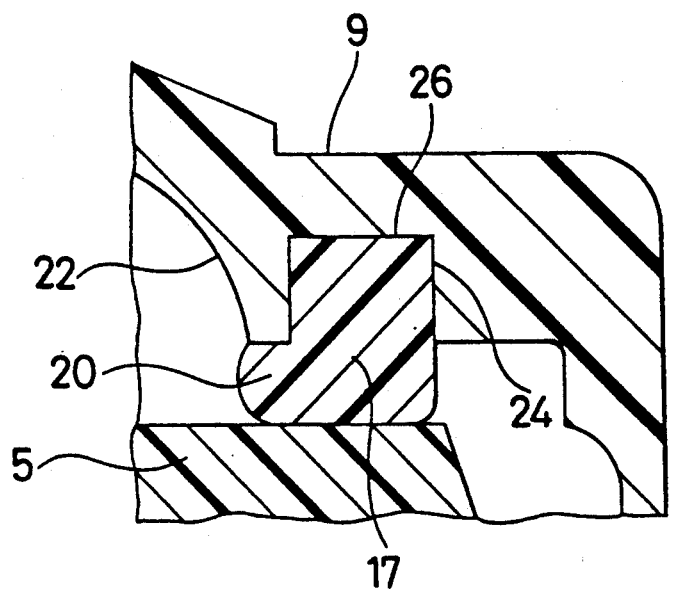
FIG. 3 is an enlarged sectional view of a part of the blood port shown in FIG. 2 attached to the housing.

As the blood ports 9 and 10 are constructed as described above, the annular elastic rib 20 is deformed by pressure and pinched between the annular rib 22 of the blood port 9 and the partition 5 to seal securely the gap between the blood port 9 and the partition 5 as shown in FIG. 3. Moreover, since the space between the annular rib 22 and the partition 5 is reduced, formation of blood clots due to the stagnation of blood within this space can be substantially prevented.

In the embodiment shown in FIG. 1, about 6,000 to about 50,000 of hollow fibers for dialyzation are housed in the housing 2 filling the whole inner space of the housing 2. These hollow fibers are secured at their end to the ends of the housing 2 by means of the partitions 5 and 6 in a liquid tight fashion with the opening at their ends open. The space in the housing 2 is separated into a dialysis liquid chamber defined by the outside surface of the hollow fibers, the inside surface of the housing 2 and the partitions 5 and 6 and blood chambers defined within the hollow fibers.

The housing 2 is formed of polycarbonate, acrylonitrile-styrene-copolymer, styrene, or butylene-styrene-copolymer. The housing 2 is a hollow cylinder and preferably a circular cylinder. This cylindrical housing is provided with the inlet 11 for a dialysis liquid at the side wall near one end and the outlet 12 of the liquid at the side wall near the other end.

The hollow fibers 3 are hollow-fiber membranes for dialyzation which are made of regenerated cellulose (cellulose acetate, cuprammonium cellulose, etc.), cellulose derivatives, ethylene-vinyl alcohol copolymer and acrylonitrile copolymer and have a hydrophilic property. The hollow fibers 3 have a lumen extending through its length and a wall thickness of 5 to 35 μm, preferably 10 to 20 μm and an outer diameter of 50 to 500 μm, preferably 100 to 300 μm.

The partitions 5 and 6 are made of a potting agent such as polyurethane or silicone-rubber. It is desirable that the partitions 5 and 6 have an area near the circumference with no fiber ends retained and the annular elastic member described below comes into contact with this area. This is to prevent the fiber ends from being blocked under the annular elastic member and utilize all the fibers in the housing.

At the ends of the housing 2, the blood ports are attached.

The blood ports 9 and 10 of the embodiment shown in FIG. 1 have a joint portion 23, which fits to the end of the housing 2 and is secured to the housing 2 by welding using high frequency electromagnetic wave or ultrasonic vibration.

In the inside surfaces of the blood ports 9 and 10, annular elastic members 17 and 18 are conjoined by composite molding.

The annular elastic members 17 and 18 are pressed to the partitions 5 and 6 and seal the peripheral areas of the partitions.

Hereinafter described is the construction of the partitions taking the blood port 9 as an example, as the blood ports 9 and 10 have the same construction though the direction of the blood stream in them is opposite.

As shown in FIG. 2, an annular groove 26 is formed in the peripheral area of the inside surface of the blood port 9. The sides of the annular groove 26 are defined by the radially-outside surface of the annular rib 22 and the radially-inside surface of the shoulder 24 in the inside surface of the blood port 9. The annular elastic member 17 is formed as a single part by filling an elastic material into the annular groove 26. The annular elastic member 17 has an annular elastic rib 20 which protrudes out of the groove 26, that is, downward from the annular elastic member 17. More specifically, it is preferable the annular elastic rib 20 is extended from the radially-inner side portion of the annular elastic member 17 and its outer diameter becomes smaller toward the top end. Thus tapered, the annular elastic rib 20 becomes thinner toward the top end and is deformed toward the annular rib 22 of the blood port 9 without fail when pressed to the partition 5. It is more preferable that the radially-outer side of the annular elastic rib 20 is curved concave in about a quarter circle. The annular elastic rib 20 is then more readily deformed toward the annular rib 22.

Further, not limited to the shape shown in FIG. 2, the cross-section of the annular elastic rib 20 may be substantially semicircular, substantially rectangular, substantially triangular or any other figures or in a shape whose top or bottom portion is broader than the breadth of the opening of the annular groove 26. Generally, the preferable dimensions of the annular groove 26 is about 2.0 to 5.0 mm in breadth and about 1.0 to 3.0 mm in depth. The height of the annular elastic rib 20 is preferably about 0.5 to 2.0 mm. When formed so as to become thinner toward the top end as shown in FIG. 2, the thickness is preferably about 2.0 to 5.0 mm at the bottom and less than about 2.5 mm at the top. The top end of the annular elastic rib 20 is preferably formed in a flat surface. The radially-inner side of the annular elastic rib 20 is preferably formed in such a cross-sectional shape not to prevent the deformation of the annular elastic rib 20, specifically about a flat surface.

As shown in FIG. 3 which is an enlarged sectional view of the area around the annular elastic rib 20 when the blood port 9 is attached to the housing 2, the annular elastic rib 20 is pressed along with the annular elastic member 17 and a part of the annular elastic rib 20 is thereby deformed and pinched between the partition 5 and the annular rib 22 of the blood port 9, sealing the gap between the partition 5 and the annular rib 22. In addition, the space left in the gap is reduced.

Figure 4:
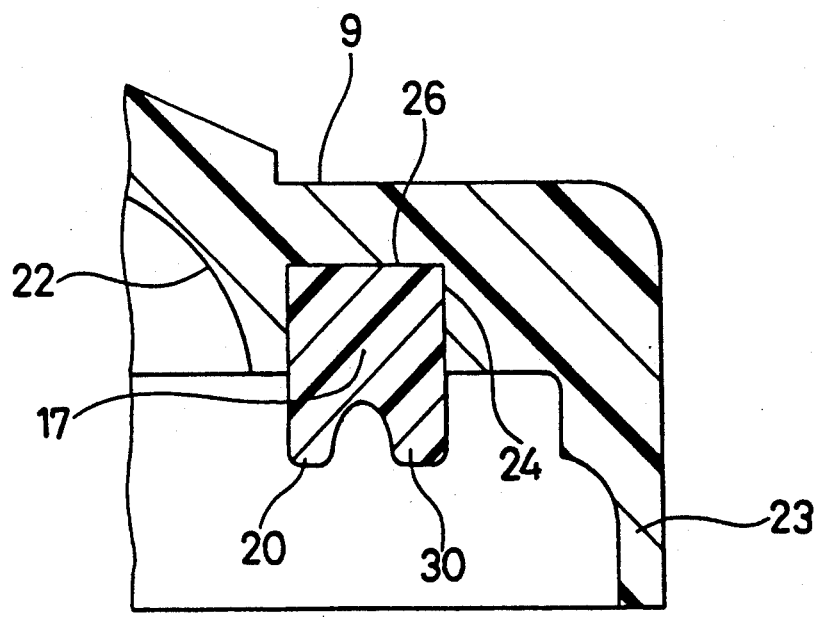
FIG. 4 is an enlarged sectional view of a part of the blood port used in the hollow fiber type blood processing apparatus of another embodiment of the present invention.

Further as shown in FIG. 4, the annular elastic member 17 may be formed in such a shape that it has a first annular elastic rib 20 which extends from the radially-inner portion of the annular elastic member 17 and is pinched between the partition 5 and the annular rib 22 of the blood and port 9 and a second annular elastic rib 30 which extends from the radially-outer portion of the annular elastic member 17 and is pinched between the partition 5 and the shoulder portion 24 of the blood port 9. By thus forming two annular elastic ribs 20 and 30, the sealing capability is improved. It is preferable that the first annular elastic rib 20 is deformed sooner than the second annular elastic rib 30. For this purpose, the second annular elastic rib 30 is preferably a little, specifically 0.2 to 0.5 mm, lower than the first annular elastic rib 20 as shown in FIG. 4. The second annular elastic rib 30, as well as the first annular elastic rib 20, is preferably formed in such a shape that the inner diameter becomes greater and the cross-section then becomes thinner toward the top end so as to be readily deformed. The second annular elastic rib 30 is preferably 0.3 to 2.0 mm in height. When so formed as to become thinner toward the top end, the thickness of the cross section is preferably about 1.0 to 2.5 mm at the bottom and about 0.5 to 1.5 mm at the top.

When the blood ports 9 and 10 as described above is attached to the housing 2, a blood entrance chamber is defined by the blood port 9 and partition 5 and a blood exit chamber by the blood port 10 and the partition 6.

By using the blood port 9 with the annular elastic member 17 conjoined by composite molding, the annular elastic rib 20 of the annular elastic member 17 is pressed to the peripheral area of the partitions 5 with no fiber ends retained and thereby the annular elastic rib 20 and the annular elastic member 17 are deformed, the blood port and the housing are tightly sealed.

A method to form the annular elastic member 17 as an integrated part of the blood port 9 is first to injection mold a blood port and then to injection mold an elastic member in the inside surface of the blood port using two-color molding.

Another method is first to place a preformed elastic member or inject mold an elastic member into a metal injection-mold and then to inject mold a blood port using insertion molding or injection molding. For the insertion molding method as for the two-color molding method, it is desirable to use easily weldable the materials for the blood port and the annular elastic member.

The materials preferable for the blood port are thermoplastic resins such as polyolefin (polypropylene, polyethylene, etc.), polycarbonate, acrylonitrile-styrene copolymer, butadiene-styrene copolymer, and polystyrene. The materials preferable for the annular elastic member are silicone rubber, polyurethane rubber, isoprene rubber, vulcanized rubber, butadiene rubber, ethylene-propylene rubber, polyolefin elastomer, styrene elastomers (styrene-butadiene-styrene block copolymer as for example).

When using the two-color molding method, it is preferable to use for the annular elastic member a material mutual-solutable or weldable with the material of the blood port. When the blood port 9 is formed of a polyolefin resin, for example, a polyolefin elastomer is preferable for the annular elastic member 17. However, by modifying the form of the groove 26, silicone rubber, polyurethane rubber, and vulcanized rubber can be used as the elastic material. When the blood port 9 and annular elastic member 17 are formed by insertion-molding, elastomers such as isoprene rubber, ethylene-propylene rubber, and silicone rubber may be used for the annular elastic member 17.

Next another embodiment of a hollow fiber type liquid processing apparatus of the present invention is described.

Figure 5:
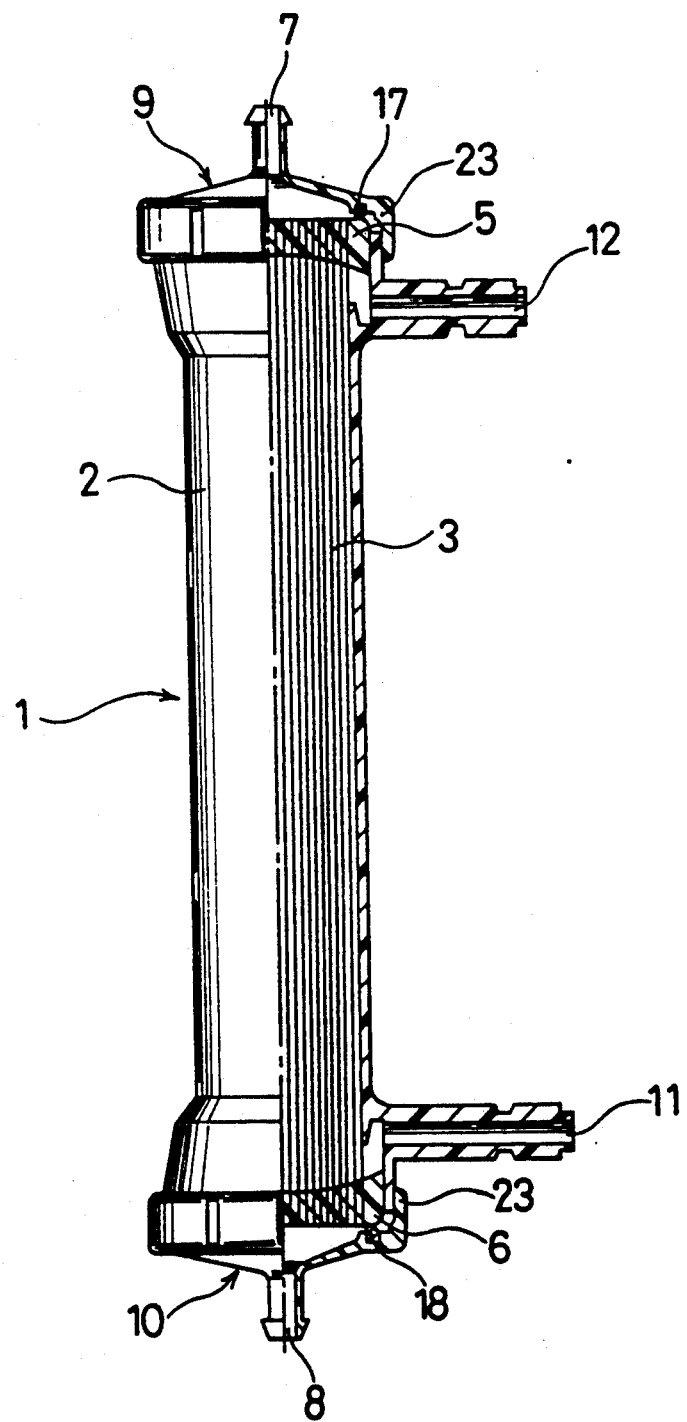
FIG. 5 is a part-sectional view of the hollow fiber type blood processing apparatus of another embodiment of the present invention.
Figure 6:
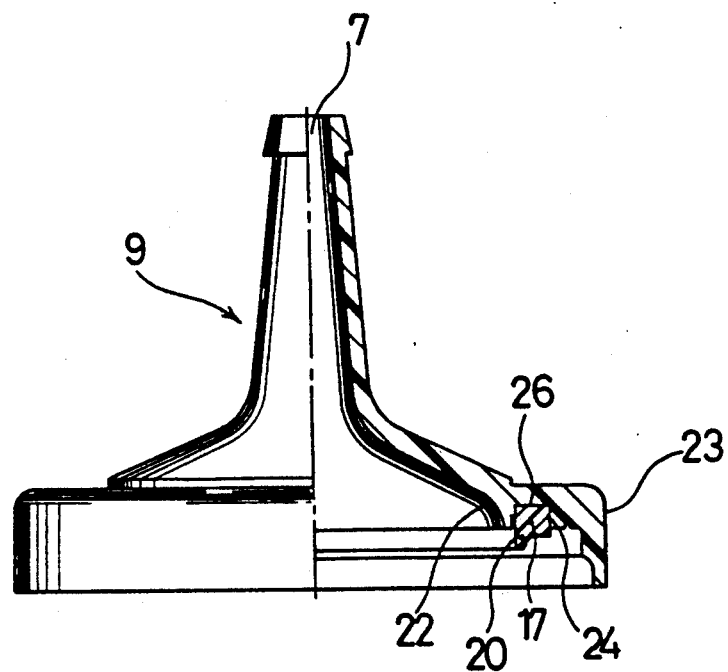
FIG. 6 is an enlarged part-sectional view of a part of the blood port used in the hollow fiber type blood processing apparatus of another embodiment of the present invention.

FIG. 5 is a part-sectional view of another embodiment of a hollow fiber type liquid processing apparatus of the present invention applied to an artificial dialyzer. FIG. 6 is an enlarged scale sectional view of the blood ports used in the hollow fiber type blood processing apparatus in FIG. 5.

A hollow fiber type liquid processing apparatus 1 of the present invention comprises the housing 2; a bundle of hollow fibers 3 which consists of a great number of hollow fibers for processing blood and is housed in the housing 2; an inlet 11 and an outlet 12 for a blood processing liquid which are provided near the ends of the housing 2; partitions 5 and 6 which retain the ends of hollow fibers 3 at the ends of the housing 2; a entrance blood port 9 which is attached to the end of the housing 2 on the side of the partitions 5 and has a blood inlet 7; and a exit blood port 10 which is attached to the end of the housing 2 on the side of the partitions 6 and has a blood outlet 8. The blood ports 9 and 10 have an annular groove 26 formed in the peripheral area of their inside surface, an annular elastic member 17, 18 secured in the annular groove 26, and an annular hollow space 32 formed between the annular elastic member 17, 18 and an annular rib 22 which defines the radially inner side of the annular groove 26. The blood ports 9 and 10 are secured to the housing 2 in such a manner that the annular elastic members 7 and 8 are pressed to the partitions 5 and 6.

Hereinafter described is the construction of the partitions taking the blood port 9 as an example, as the blood ports 9 and 10 have the same construction though the direction of the blood stream in them is opposite.

Figure 8:
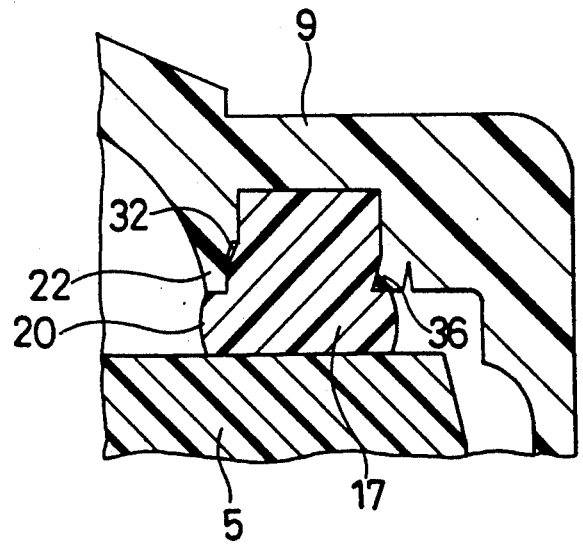
FIG. 8 is an enlarged sectional view of a part of the blood port shown in FIG. 7 attached to the housing.

In the hollow fiber type blood processing apparatus of this embodiment, the annular hollow space 32 is provided between the annular elastic member 17 and the annular rib 22 which defines the radially-inner side of the annular groove 26 as described above. Accordingly, burrs grow in the annular groove along the surface of the annular elastic member 17 when first molding the annular elastic member 17 and then injection molding the blood port 9, while they grow in the annular hollow space 32 along the surface of the annular rib 22 when first molding the blood port 9 and then injection molding the annular elastic member 17. Since the annular elastic member 17 is pressed between the blood port 9 and the partition 5 and thereby deformed to fill the annular hollow space 32 as shown in FIG. 8, however, the small projections made of burrs do not come into contact with the circulated blood. Consequently, clot formation due to the burrs can be prevented. It is also made possible to prevent fine pieces of broken burr from entering into the blood and flowing into the patient's body.

Hereinafter described is the hollow fiber type dialyzer shown in FIG. 5 as an embodiment of the hollow fiber type liquid processing apparatus.

Housed in the cylindrical housing 2 of this hollow fiber type blood processing apparatus 1 are about 6,000 to about 50,000 of dialyzation membranes in the form of hollow fibers 3. These hollow fibers 3 are secured to the ends of the housing 2 by means of the partitions 5 and 6 in a liquid tight fashion with the opening at their ends kept open. The space in the housing 2 is separated into a dialysis liquid chamber defined by the outside surface of the hollow fibers, the inside surface of the housing 2 and the partitions 5 and 6, and blood chambers defined within the hollow fibers.

The housing 2 is formed of polycarbonate, acrylonitrile-styrene-copolymer, styrene, or butadiene-styrene-copolymer. The housing 2 is a hollow cylinder and preferably a circular cylinder. This cylindrical housing 2 is provided with the inlet 11 for a dialysis liquid at the side wall near one end and the outlet 12 of the liquid at the side wall near the other end.

The hollow fibers 3 are hollow-fiber membranes for dialyzation which are made of regenerated cellulose (cellulose acetate, cuprammonium cellulose, etc.), cellulose derivatives, ethylene-vinyl alcohol copolymer and acrylonitrile copolymer and have a hydrophilic property. The hollow fibers 3 have a lumen extending through its length and a wall thickness of 5 to 35 $\mu$m, preferably 10 to 20 $\mu$m and an outer diameter of 50 to 500 $\mu$m, preferably 100 to 300 $\mu$m.

The partitions 5 and 6 are made of a potting agent such as polyurethane and silicone-rubber. It is desirable that the partitions 5 and 6 have an area near the circumference with no fiber ends retained. The annular elastic members 17 and 18 described below comes into contact with this area. This is to prevent the fiber ends from being blocked under the annular elastic members 17 and 18 and makes it possible to utilize all the fibers in the housing.

In the embodiment shown in FIG. 5, the blood ports 9 and 10 have a joint portion 23, which fits to each end of the housing 2 and is secured to the housing 2 by welding using high frequency electromagnetic wave or ultrasonic vibration.

In the annular groove 26 of the blood ports 9 and 10, the annular elastic members 17 and 18 are provided.

The annular elastic members 17 and 18 are pressed to the partitions 5 and 6 and seal the aforementioned peripheral areas of the partitions.

As shown in FIG. 6, the annular groove 26 formed in the peripheral area of the blood port 9 are defined by the radially-outer side of the annular rib 22 and the radially-inner side of the shoulder 24 formed in the inside surface of the blood port 9. The annular elastic member 17 is so formed as to fill the annular groove 26 and protrudes out of the groove 26. The annular hollow space 32 is formed between the annular elastic member 17 and the annular rib 22 which defines the radially-inner side of the annular groove 22. For the dimensions of annular hollow space 32, though they depend on the size of the blood port and the annular elastic member, the preferable breadth is about 0.2 to 1.0 mm and the preferable depth is greater than 0.5 mm and less than about ⅔ of the depth of the annular groove 26 described below.

Figure 7:
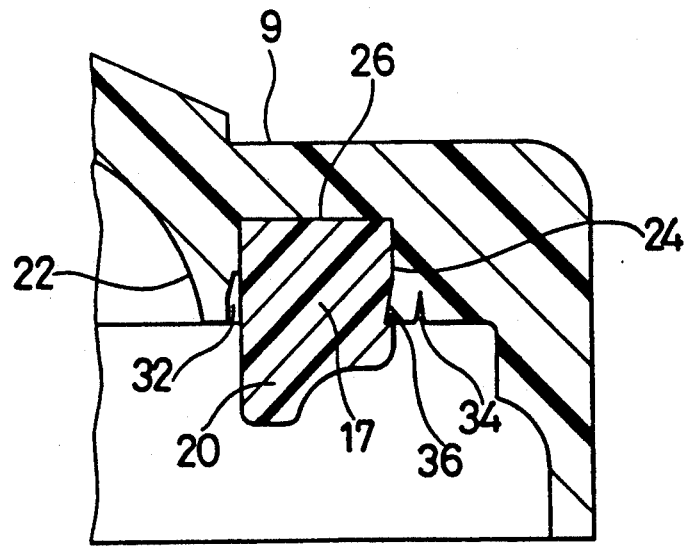
FIG. 7 is an enlarged sectional view of an area around the annular elastic element of the blood port shown in FIG. 6.

Further, it is desirable that the annular elastic member 17 has an annular elastic rib 20 protruding out of the groove 26 as shown in FIG. 7. By forming such an annular elastic rib 20, the annular elastic member 17, especially the portion of the elastic rib 20 is pressed and deformed and pinched between the partition 5 and the annular rib 22, then seal the gap securely. In addition, the gap space between the partition 5 and the annular rib 22 is reduced and the clot formation due to the stagnation of blood within this space can be prevented. Specifically, the annular elastic rib 20 protrudes from the radially-inner portion of the annular elastic member 17. It is preferable that the outer diameter of the annular elastic rib 20 becomes smaller toward the top end. Thus tapered, the cross-section of the annular elastic rib 20 becomes thinner toward the top end and the rib 20 is deformed toward the annular rib 22 of the blood port 9 without fail. It is more preferable that the radially-outer side of the annular elastic rib 20 is curved concave in the shape of about a quarter circle. Then the annular elastic rib 20 is more readily deformed toward the annular rib 22. Further, the shape of the annular elastic member 17 is not limited to the one with the cross section as in FIG. 7, but may be semicircular as in FIG. 13, rectangular, triangular or such shape that the top or bottom portion is broader than the breadth of the opening of the annular groove 26. Generally, the preferable dimensions of the annular groove 26 is about 2.0 to 5.0 mm in breadth and about 1.0 to 3.0 mm in depth. The height of the annular elastic rib 20 is preferably about 0.5 to 2.0 mm. When the annular elastic rib is formed so that the cross-section becomes thinner toward the top end as shown in FIG. 7, the thickness is preferably about 2.0 to 5.0 mm at the bottom and less than about 2.5 mm at the top. The top end of the annular elastic rib 20 is preferably formed in a flat surface. The radially-inner side of the annular elastic rib 20 is preferably so shaped as not to prevent the deformation, specifically in a flat surface. Moreover, it is preferable that a protruding portion 36 is formed at the edge of the radially-inner side of the shoulder 24 of the blood port 9. By forming such a protrusion 36, the annular elastic member 17 is more securely fixed in the annular groove 26 so as not to slip off the annular groove 26 if the material of the annular elastic member 17 does not weld or not strongly weld to the material of the blood port 9. Instead of forming the protrusion 36, the radially-inner side of the shoulder 24 may be formed so that the annular groove 26 becomes narrower toward the opening. However, the aforementioned protrusion is more preferable for technical reasons of forming.

The method for forming the above blood port 9 is simply described below using FIG. 9.

First, the blood port 9 is formed within a metal mold by injection molding. Then before the molded resin cools down completely, the section of the metal mold for forming the inside surface of the blood port 9 is removed and the metal mold 40 of the annular elastic member 7. FIG. 9 shows this state. As show in FIG. 9, the metal mold of the annular elastic member 7 has a protruding rib 42 for forming the annular hollow space 32 and an annular protrusion 44 which thrusts into the shoulder 24 of the blood port 9. By this thrust of the annular protrusion 44 into the shoulder 24, the radially inner edge portion of the shoulder 24 is pressed toward the annular groove 26 and the protrusion 36 is formed. Alternatively, it also be possible to form a protrusion 36 by fist forming an annular protrusion 44 at the radially-outer side in the annular groove 26 and then bending the protrusion 44 toward the annular groove 26 by the metal mold of the annular elastic member. This protrusion serves as a stopper to prevent the annular elastic member molded at the next step from slipping out of the groove. Next a resin for the annular elastic member is injected into the annular hollow space 26. Thus the blood port 9 with the annular elastic member provided in the annular groove 26 is made. By this method, burrs grow between the top end of the protruding rib 42 and the blood port 9.

Figure 13:
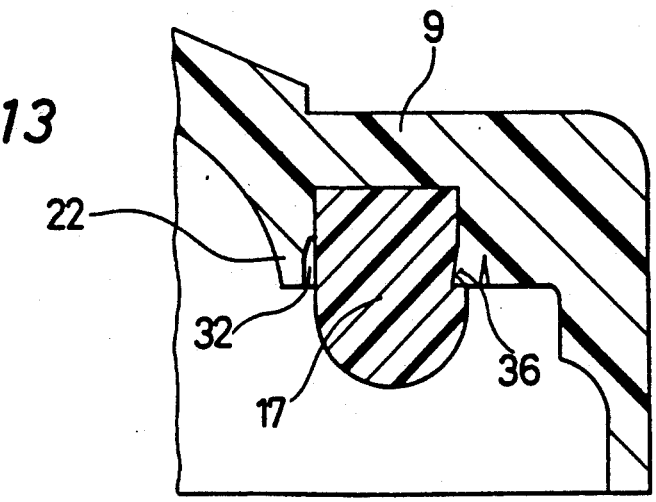
FIG. 13 is an enlarged sectional view of an area around the annular elastic element of the blood port of the hollow fiber type blood processing apparatus of another embodiment of the present invention.
Figure 14:
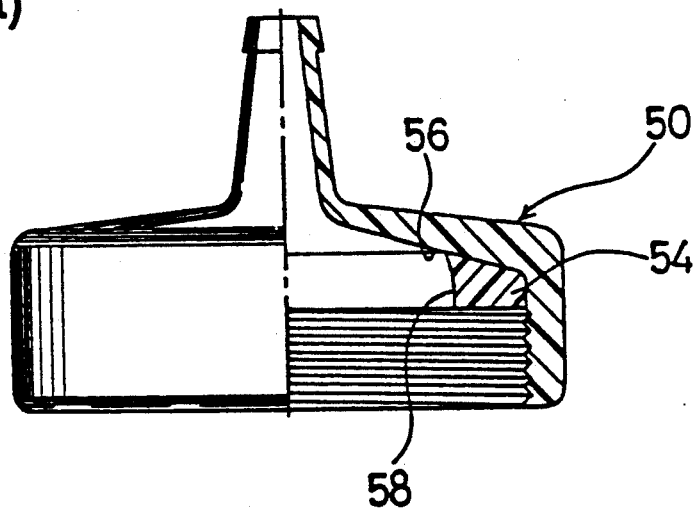
FIG. 14 is an enlarged sectional view of a blood port used in a conventional hollow fiber type blood processing apparatus.

The shape of the annular elastic rib 20 of the annular elastic member 17 is not limited to the one as described above, but may be substantially semicircular as shown in FIG. 13, about rectangular, or any other shapes in cross section.

As shown in FIG. 8, an enlarged sectional view of the state in which the blood port 9 is attached to the housing 2, the annular elastic member 17 and its annular elastic rib 20 are pressed. Thereby a portion of the annular elastic member 17 is deformed so that the annular hollow space 32 is filled and the burrs are buried under the annular elastic member. Consequently, blood do no flow into the annular hollow space 32 nor contact with the burrs. Moreover, the annular elastic member 17 is deformed and pinched between the partition 5 and the annular rib 22 to seal tightly the blood port 9 and the housing 2. As another result, the gap space between the annular rib 22 and the partition 5 is reduced.

Figure 11:
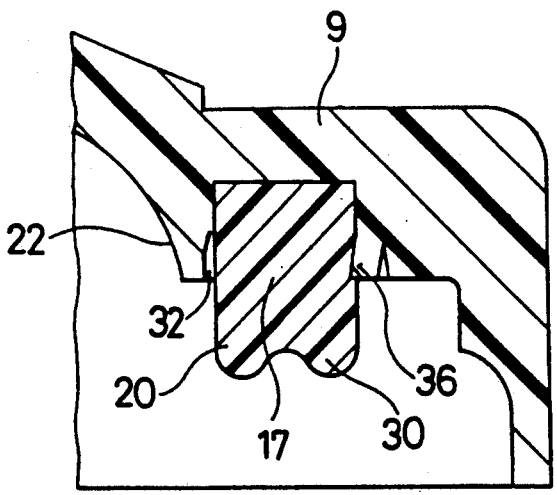
FIG. 11 is an enlarged sectional view of an area around the annular elastic element of the blood port of the hollow fiber type blood processing apparatus of another embodiment of the present invention.
Figure 12:
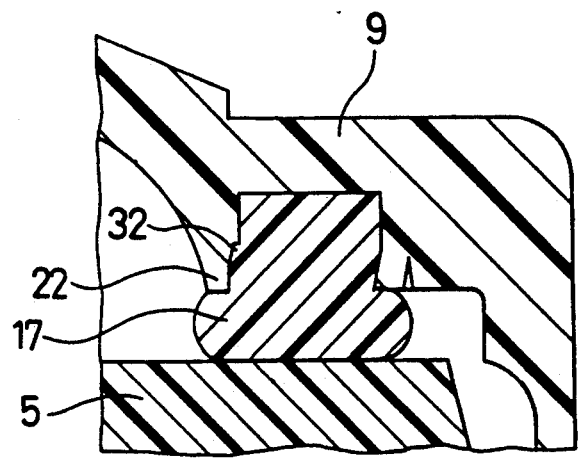
FIG. 12 is an enlarged sectional view of a part of the blood port shown in FIG. 11 attached to the housing.

Further as shown in FIG. 11, the annular elastic member 17 may be formed in such a shape that it has a first annular elastic rib 20 which extends from the radially-inner portion of the annular elastic member 17 and is pinched between the partition 5 and the annular rib 22 of the blood port 9 and a second annular elastic rib 30 which extends from the radially-outer portion of the annular elastic member 17 and is pinched between the partition 5 and the shoulder 24 of the blood port 9. FIG. 12 shows the sate in which such a blood port is attached to the housing 12 in an enlarged sectional view of the area around the annular elastic member 17. As shown in FIG. 13, the annular elastic member and its annular elastic ribs 20 and 30 are pressed. Thereby a portion of the annular elastic member 17 is deformed so as to fill the annular hollow space 32. By forming two annular elastic ribs 20 and 30, the sealing capability is improved. It is preferable that the first annular elastic rib 20 is deformed sooner than the second annular elastic rib 30. For this purpose, the second annular elastic rib 30 is preferably a little, specifically 0.2 to 0.5 mm, lower than the first annular elastic rib 20 as shown in FIG. 4. So as to be readily deformed, the second annular elastic rib 30, as well as the first annular elastic rib 20, is preferably formed in such a shape that the inner diameter becomes greater and the cross-section then becomes thinner toward the top end. The second annular elastic rib 30 is preferably 0.3 to 2.0 mm in height. When so formed as to become thinner toward the top end, the thickness of the cross section is preferably about 1.0 to 2.5 mm at the bottom and about 0.5 to 1.5 mm at the top.

When the blood port 9 as described above is attached to the housing 2, a blood entrance chamber is defined by the blood port 9 and partition 5 (a blood exit chamber by the blood port 10 and the partition 6).

By using the blood port 9 with the annular elastic member 17 conjoined by composite molding, the annular elastic rib 20 of the annular elastic member 17 is pressed to the peripheral area of the partitions 5 with no fiber ends retained and thereby the annular elastic rib 20 and the annular elastic member 17 are deformed, the blood port and the housing are tightly sealed.

A method to form the annular elastic member 17 as an integrated part of the blood port 9 is first to injection mold a blood port and then to injection mold an elastic member in the inside surface of the blood port using two-color molding.

Another method is first to place a preformed elastic member or inject mold an elastic member into a metal injection-mold and then to inject mold a blood port using insertion molding or two-color molding.

Figure 9:
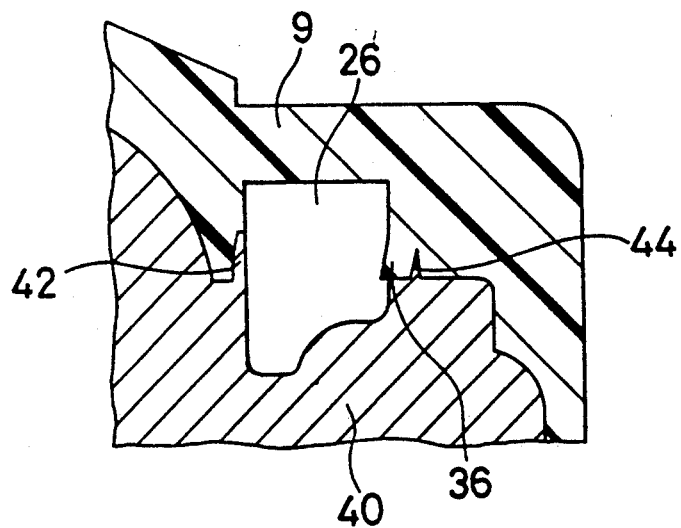
FIG. 9 shows a molding step of the blood port shown in FIG. 7.
Figure 10:
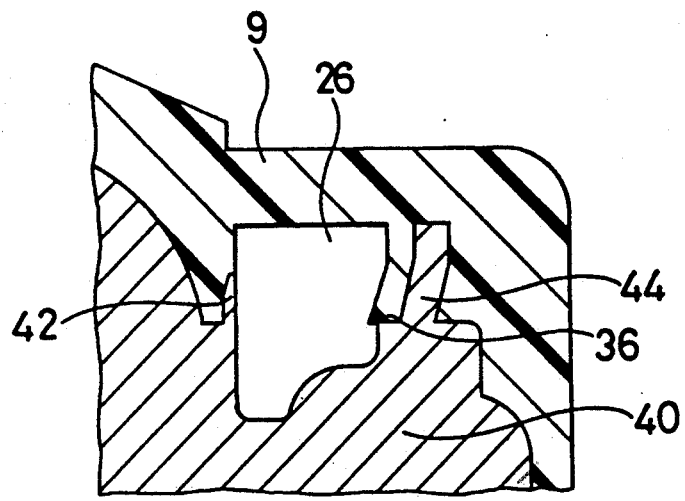
FIG. 10 shows a molding step of the blood port of the hollow fiber type blood processing apparatus of another embodiment of the present.

By the above two-color molding method, burrs grow along the top end of the protruding rib 42 in FIG. 9. By the above insertion molding method, on the other hand, burrs grow along the radially-outer side (right side in FIG. 9) near the top end of the protruding rib 42. However, these burrs are buried under the annular elastic member 17 when the blood port 9 is attached.

For the insertion molding method as for the two-color molding method, it is desirable to use easily weldable materials for the blood port and the annular elastic member or to use the construction in which the annular elastic member 17 does not easily slip off the annular groove 20.

The materials preferable for the blood port 9 are thermoplastic resins such as polyolefin (polypropylene, polyethylene, etc.), polycarbonate, acrylonitrile-styrene copolymer, butadiene-styrene copolymer, and polystyrene. The materials preferable for the annular elastic member are silicone rubber, polyurethane rubber, isoprene rubber, vulcanized rubber, butadiene rubber, ethylene-propylene rubber, polyolefin elastomer, styrene elastomers (styrenebutadiene-styrene block copolymer as for example). When using the two-color molding method, it is preferable to use for the annular elastic member a material mutual-solutable or weldable with the material of the blood port. When the blood port 9 is formed of a polyolefin resin, for example, a polyolefin elastomer is preferable for the annular elastic member 17. For the port 9 of the construction as shown in FIG. 7 which has a protrusion for serving as a stopper, however, materials such as silicone rubber, polyurethane rubber, and vulcanized rubber which are not mutual-solutable nor weldable with the material of the blood port 9 can be used. When using resins as silicone rubber and polyurethane rubber as the material for the annular elastic member 17, injection molding of the elastic material can be made at about ordinary temperature. Cold injection is preferable, because the resin injected at ordinary temperature does not cause distortion nor melting of the surface of the blood port 9 as caused by the hot resin.

When using the insertion-molding method, elastomers such as isoprene rubber, ethylene-propylene rubber and silicone rubber are preferable.

The hollow fiber type artificial dialyzer 1 is sterilized before use by means of conventional pasturization method such as ethylene oxide gas pasturization and autoclave pasturization. When using an autoclave, the dialyzer is sterilized with the inside (both dialysis liquid chamber and blood chamber) filled with a liquid harmless to the human body (physiological salt solution, germfree water, etc.) and with all the openings sealed with an appropriate elastic material.

One more embodiment of the hollow fiber type liquid processing apparatus of the present invention is described.

The hollow fiber type liquid processing apparatus 60 of the present invention comprises the housing 2; a bundle of hollow fibers 65 which comprises a great number of hollow fibers for processing blood and is housed in the housing 64; an inlet 62 and an outlet 64 for a blood processing liquid provided near the ends of the housing 64; partitions 66 and 67 which retain the ends of hollow fibers at the ends of the housing 64; a entrance blood port 70 which is attached to one end of the housing 64 and has a blood inlet 68; and a exit blood port 71 which is attached to the other end of the housing 64 on the side and has a blood outlet 69. The entrance blood port 70 and the exit blood port 71 have different inside shapes.

Figure 15:
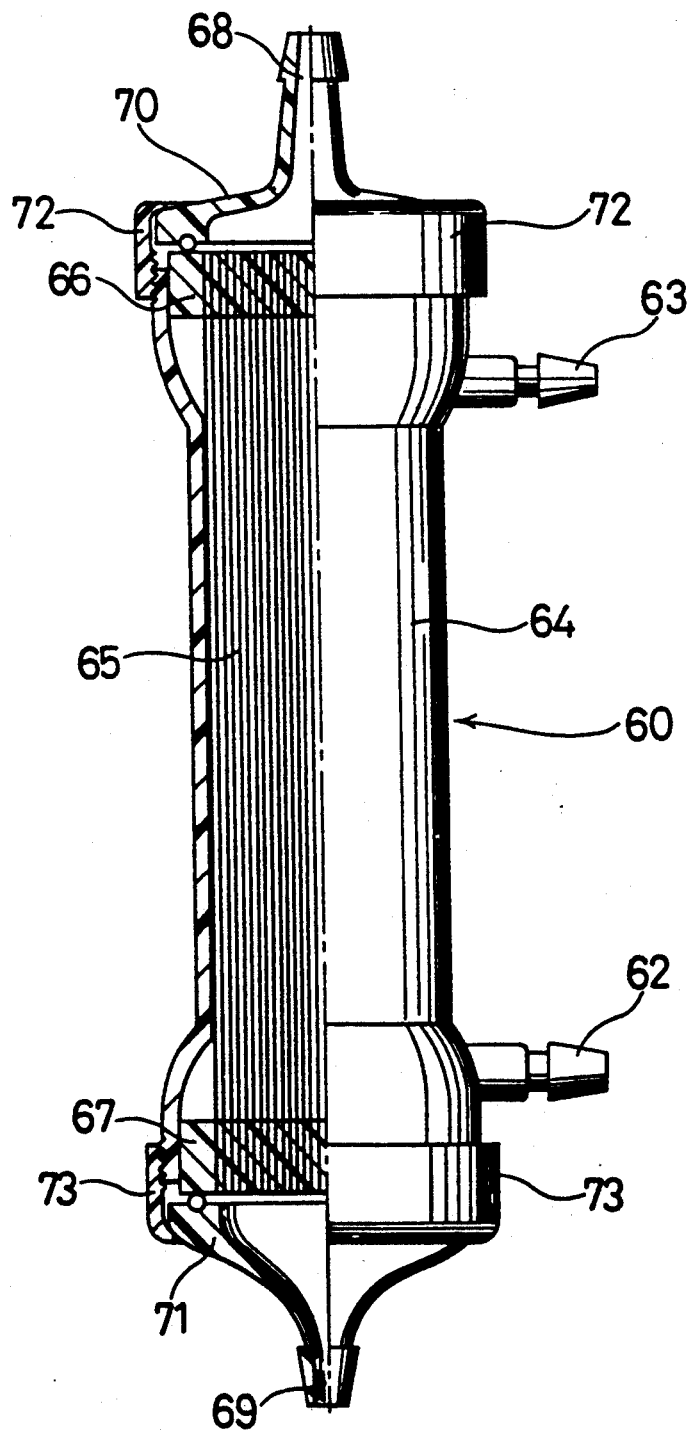
FIG. 15 is an enlarged sectional view of an artificial dialyzer which embodies the hollow fiber type blood processing apparatus of the present invention.

FIG. 15 shows an embodiment of the hollow fiber type liquid processing apparatus of the present invention utilized for a artificial dialyzer.

The housing 64 is provided with the inlet 62 for a dialysis liquid near one end and the outlet 63 of the liquid near the other end. In the housing, the hollow fibers 65 are housed. Both ends of the hollow fibers are retained by the partitions 65 and 67 made of a potting agent such as polyurethane in a liquid tight fashion and secured to the housing 64. At both ends of the housing 64, the blood ports 70 and 71 provided with the blood inlet 68 and blood outlet 69 are secured by threaded rings 72 and 73.

In the above artificial dialyzer, the blood port 70 provided with the blood inlet 68 serves as the entrance blood port and the blood port 71 provided with the blood outlet 69 serves as the exit blood port. In this embodiment, the entrance-side blood port and the exit blood port need to have different inside shapes.

Figure 16:
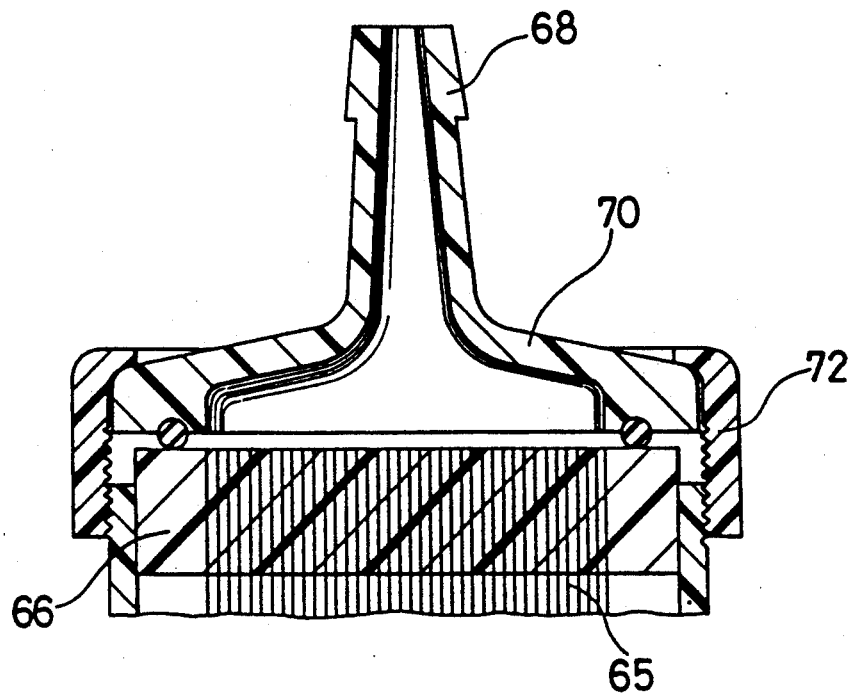
FIG. 16 is an enlarged sectional view of the entrance blood port shown in FIG. 15.

As shown in FIG. 16, for an example, the inner side of the exit blood port 71 is formed in such a shape that the inside space is greater and the inclination of the inside surface with respect to the partition surface is greater, while the inner side of the entrance blood port 70 is formed in such a shape that the inside space is smaller and said inclination of the inside surface is smaller.

By thus forming each blood ports, the blood flowing into the entrance blood port 70 from the blood inlet 68 through an external circulation tube (not shown) collides against the partition 65, spreads all over the surface of the partition 65, and enters all the hollow fibers equally as shown in FIG. 16, since the inclination of the inside surface of the entrance blood port 70 is comparatively small. On the other hand, the blood flowing out from the hollow fibers exits from the blood outlet 69 into a return tube (not shown) washing the inside surface of the exit blood port 71 as shown in FIG. 17, since the angle of inclination of the inside surface of the exit blood port 71 is comparatively great.

Figure 18:
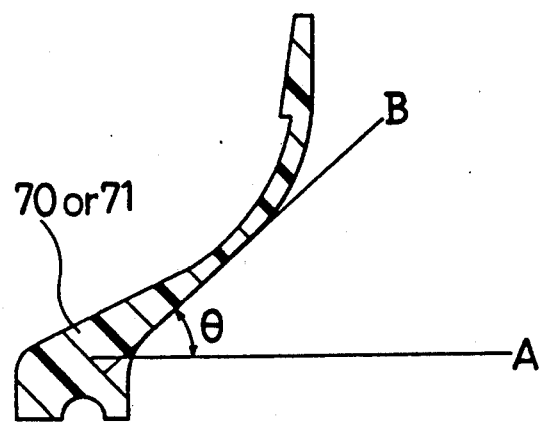
FIG. 18 is a illustration for explaining the inclination of the inside surface of the blood ports.

For this embodiment, the ratio of the inclination of the inside surface of the exit blood port 71 $\theta_1$ to that of the entrance blood port 70 $\theta_2$ is 1.1 to 3.0, preferably $\theta_1/\theta_2$ is 1.19 to 2.5. Further, the inclination of the inside surface of the entrance blood port 71 $\theta_1$ is 10° to 30°, preferably 12° to 26°. Where, as shown in FIG. 18, the inclination of the inside surface $\theta$ means the angle at which the inside surface B of the blood ports 70 and 71 inclines with respect to a plane A parallel with the partition.

Figure 17:
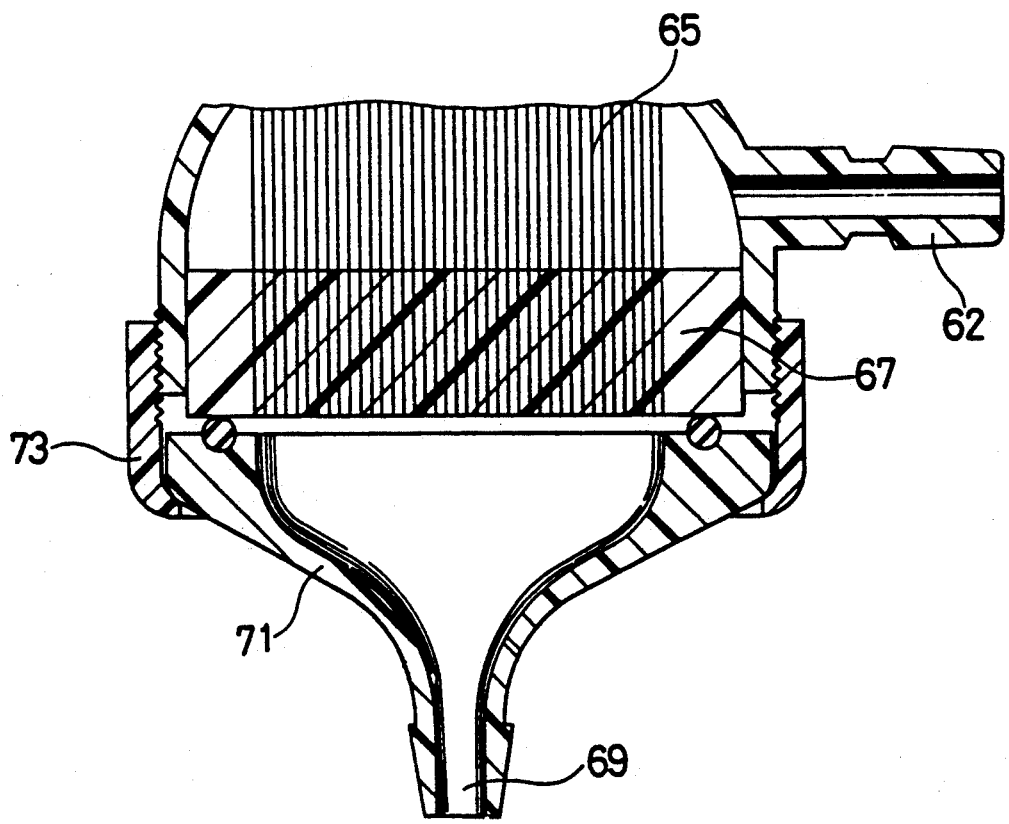
FIG. 17 is an enlarged sectional view of the exit blood port shown in FIG. 15.

Hereinafter explained is the result of a dialyzation test of a hollow fiber type artificial dialyzer 60 as shown in FIGS. 15 to 17 for various inclination angles and ratios of the inclinations as shown in Table 1. The total area of the hollow fiber membranes (made of regenerated cellulose) was 1.2 m². Under this conditions, dialyzation tests (ex. vivo) were conducted using cattle blood. The quantity of the blood flow per minute QB were 200 ml/min and that of the processing liquid was 500 ml/min. Addition of heparin was 1,000 units only dosed when the blood was gathered.

TABLE I

| | Inclination of the inside surface of the entrance blood port [θ 2] | | | | |
|---|---|---|---|---|---|
| | 9 | 14 | 23 | 27 | 32 |
| Inclination of the inside surface of the entrance blood port [θ 1] | | | | | |
| 9 | 1 | 0.64 | 0.39 | 0.33 | 0.28 |
| 14 | 1.58 | 1 | 0.61 | 0.52 | 0.44 |
| 23 | 2.56 | 1.64 | 1 | 0.85 | 0.72 |
| 27 | 3.00 | 1.93 | 1.17 | 1 | 0.84 |
| 32 | 3.58 | 2.29 | 1.39 | 1.19 | 1 |

Note: Numbers in the table indicate the ratio θ 1/θ 2.

Table II shows the performance of each artificial dialyzer using the corresponding blood ports in Table examined

TABLE II

| | Inclination of the inside surface of the entrance blood port [θ 2] | | | | |
|---|---|---|---|---|---|
| | 9 | 14 | 23 | 27 | 32 |
| Inclination of the inside surface of the entrance blood port [θ 1] | | | | | |
| 9 | 3 | 2.5 | 2.5 | 2 | 2 |
| 14 | 4.5 | 4 | 3 | 2.5 | 2 |
| 23 | 4.5 | 5 | 4 | 4 | 2.5 |
| 27 | 4.5 | 5 | 4.5 | 4 | 2.5 |
| 32 | 5 | 5 | 5 | 5 | 3 |

Note: Numbers in the table indicate the circulation time required for dialyzation in hours.

TABLE II

| | Inclination of the inside surface of the entrance blood port [θ 2] | | | | |
|---|---|---|---|---|---|
| | 9 | 14 | 23 | 27 | 32 |
| Inclination of the inside surface of the entrance blood port [θ 1] | | | | | |
| 9 | 3 | 2.5 | 2.5 | 2 | 2 |
| 14 | 4.5 | 4 | 3 | 2.5 | 2 |
| 23 | 4.5 | 5 | 4 | 4 | 2.5 |
| 27 | 4.5 | 5 | 4.5 | 4 | 2.5 |
| 32 | 5 | 5 | 5 | 5 | 3 |

Note: Numbers in the table indicate the circulation time required for dialyzation in hours.

Although, the liquid processing apparatus of the present invention is described above in terms of artificial dialyzers in which the present invention is embodied, the present invention can be utilized to a lung machine, blood plasma separator, and other applications.

The hollow fiber type blood processing apparatus of the present invention comprises a housing, a bundle of hollow fibers which consists of a great number of hollow fibers for processing blood and is housed in the housing, an inlet and an outlet of a blood processing liquid which are provided near each end of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the two blood ports have each an annular groove at the peripheral area of their inside surface and an annular elastic member conjoined in the annular groove by molding, the annular elastic members have each an annular elastic rib extended out of the annular groove, and the blood ports are attached to the housing with their annular elastic member pressed to the corresponding partition and the annular elastic rib of the annular elastic member pinched between the partition and the annular rib which defines the radially inner side of the annular groove of each blood port. By this construction, the annular elastic members are deformed and pinched between each partition and the annular rib of each blood port. Therefore, it is made possible to seal securely the partitions and the blood ports without o-rings. Moreover, the gap space between the annular rib and the partition is reduced and thereby blood clot formation due to the stagnation of blood within this space can be prevented.

Further, the hollow fiber type liquid processing apparatus of the present invention comprises the housing, a bundle of hollow fibers which consists of a great number of hollow fibers for processing blood and is housed in the housing, an inlet and an outlet for a blood processing liquid which are provided near each ends of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the two blood ports have each an annular groove at the peripheral area of their inside surface and an annular elastic member secured in each annular groove, and an annular hollow space formed between the annular elastic member and the annular rib which defines the radially-inner side of the annular groove in the inside surface of each blood port and the blood ports are attached to the housing with their annular elastic member pressed to the corresponding partition. By this construction, burrs grow along the side of the annular elastic member within the annular hollow space when the annular elastic member is first molded and then the blood port is injection molded, while burrs grow along the bottom side of the annular hollow space when the blood port is first mold and then the annular elastic member is injection molded. These burrs are buried under the deformed annular elastic members when the blood ports are attached to the housing. Consequently, it is made possible to eliminate blood-clot formation due to contact with the burrs and to prevent a fine pieces of broken burr from entering the blood and flowing into the human body.

Furthermore, the hollow fiber type liquid processing apparatus of the present invention comprises the housing, a bundle of hollow fibers which consists of a great number of hollow fibers for processing blood and is housed in the housing, an inlet and an outlet for a blood processing liquid which are provided near each ends of the housing, partitions which secure each end of the bundle of hollow fibers to each end of the housing, an entrance blood port which has a blood inlet and is attached to one end of the housing, and an exit blood port which has a blood outlet and is attached to the other end of the housing, wherein the entrance blood port and the exit blood port have different inside shape from each other. By this construction, the blood stream inside the blood ports becomes smooth and the blood is distributed equally to all the hollow tubes so that the processing capability of the apparatus is increased while occurrence of blood coagulation is reduced.

When the ratio of the inclination of the inside surface of the exit blood port 71 $\theta_1$ to that of the entrance blood port 70 $\theta_2$ is 1.1 to 3.0, occurrence of blood coagulation is substantially reduced.

We claim:

1. A hollow fiber tube blood processing apparatus, comprising:
   a housing having a first and a second end portion;
   a bundle of hollow fibers that includes a plurality of hollow fibers for processing blood, the bundle of hollow fibers being housed in the housing, the bundle of hollow fibers having a first and a second end portion;
   an inlet and an outlet respectively positioned adjacent the first and the second end portions of the housing for enabling a blood processing liquid to move into and out of the housing;
   first and second partitions for respectively securing the first and second end portions of the bundle of hollow fibers to the first and second end portions of the housing;
   an entrance blood port having a blood inlet attached to the first end portion of the housing; and
   an exit blood port having a blood outlet attached to the second end portion of the housing;
   the entrance blood port having:
      a first annular groove provided at a peripheral area of an inside surface thereof;
      a first annular elastic member conjoined in the first annular groove by molding; and
      a first annular elastic rib extending out of the first annular groove;
   the exit blood port having:
      a second annular groove provided at a peripheral area on an inside surface thereof;
      a second annular elastic member conjoined in the second annular groove by molding; and
      a second annular elastic rib extending out of the second annular groove;
   the entrance blood port being attached to the housing by pressing the first annular elastic member toward the first partition so that the first annular elastic rib is pinched between the first partition and an annular rib of the entrance blood port that defines a radially-inner side of the first annular groove of the entrance blood port;
   the exit blood port being attached to the housing by pressing the second annular elastic member toward the second partition so that the second elastic annular rib of the second elastic annular member is pinched between the second partition and an annular rib of the exit blood port that defines a radially-inner side of the second annular groove of the exit blood port;
   said first and second annular elastic ribs respectively comprising:
      at least a first annular elastic rib portion that extends from a radially-inner portion of each of the annular elastic members and is pinched between one of the first and second partitions and a respective one of the annular ribs of the entrance and exit blood port defining the respective radially-inner side of the first and second annular grooves; and
      at least a second annular elastic rib portion which extends from a radially-outer portion of the annular elastic members and is pinched between one of the first and second partitions and a respective shoulder portion of the entrance and exit blood port defining a radially-outer side of each of the first and second annular grooves.

2. The blood processing apparatus of claim 1, wherein:
   said annular elastic ribs extend from the radially-inner portion of each of the first and second annular elastic members; and
   a radially-outer side of the annular elastic ribs decreasing in a diameter thereof toward a tip portion thereof so that a cross section of the annular elastic rib has a tip end thereof which is smaller in area than a base portion thereof.

3. The blood processing apparatus of claim 1, wherein:
   said at least a second annular elastic rib portion has an inner diameter thereof that increases toward a tip portion of the annular elastic rib so that a cross section of the at least a second annular elastic rib portion is smaller in area at a tip portion thereof than at a base portion thereof.

4. The blood processing apparatus of claim 1, wherein:
   the first and second annular elastic ribs of said first and second annular elastic members are respectively pressed to the respective peripheral areas of the first and second partitions so that no hollow fiber ends are secured therebetween.

5. The blood processing apparatus of claim 1, wherein:
   said blood processing apparatus is included in a hollow fiber type dialyzer.

6. The blood processing apparatus of claim 1, wherein:
   each of the first and second annular elastic members is respectively conjoined to the entrance blood port and the exit blood port by a two-color molding.

7. The blood processing apparatus according to claim 1, wherein said first and second annular elastic ribs respectively have a tip surface that is flat.

8. A hollow fiber tube blood processing apparatus, comprising:
   a housing having a first and a second end portion;
   a bundle of hollow fibers which includes a plurality of hollow fibers for processing blood, the bundle of hollow fibers being housed in the housing, the bundle of hollow fibers having a first and a second end portion;
   an inlet and an outlet respectively positioned adjacent the first and the second end portion of the housing for enabling a blood processing liquid to move into and out of the housing;
   first and second partitions for respectively securing each of the first and second end portions of the bundle of hollow fibers to the first and second end portions of the housing;
   an entrance blood port having a blood inlet attached to the first end portion of the housing; and
   an exit blood port having a blood outlet attached to the second end portion of the housing;
   the entrance blood port and the exit blood port each respectively having:
      an annular groove provided at a peripheral area of an inside surfaces thereof; and
      an annular elastic member respectively secured in said annular grooves;
      an annular hollow space formed between the annular elastic member and an annular rib which defines a radially-inner side of each of the annular grooves in an inside surface of each of the exit and entrance blood ports;

the entrance blood port and the exit blood port respectively being attached to the housing by respectively pressing first and second annular elastic members to a respective one of the first and second partitions, said annular elastic members being respectively deformed so as to respectively fill each of said annular hollow spaces; and each of said annular elastic members having an annular elastic rib extending out of said annular groove, each said annular elastic rib being pinched between one of the first and second partitions and a respective one of the annular ribs of the blood inlet and blood outlet ports defining the radially-inner side of the annular groove.

9. The blood processing apparatus according to claim 8, wherein each of the annular elastic ribs respectively extend from a radially-inner portion of each of the annular elastic members; and a radially-outer side of each annular elastic rib decreasing in a diameter toward a tip portion thereof so that a cross section of the annular elastic rib has a tip portion thereof which is smaller in area than a base portion thereof.

10. The blood processing apparatus according to claim 9, wherein:

said first and second partitions respectively have a peripheral area to which no hollow fibers are secured; and said annular elastic ribs of said annular elastic members being pressed to the peripheral areas of the first and second partitions.

11. The blood processing apparatus according to claim 8, wherein each of said annular elastic ribs comprises:

at least a first annular elastic rib portion that extends from a radially-inner portion of each of the annular elastic members and is pinched between a respective one of the first and second partitions and one of the annular ribs of the entrance and exit blood ports, said annular ribs of the entrance and exit blood ports defining the radially-inner side of the annular groove; and at least a second annular elastic rib portion which extends from the radially-outer portion of each of the annular elastic members, each of said second annular rib portions being respectively pinched between a respective one of the first and second partitions and a shoulder portion provided on each of the exit and entrance blood ports defining the radially-outer side of each of the annular grooves.

12. The blood processing apparatus according to claim 11, wherein said at least a second annular elastic rib portion has an inner diameter thereof that increases toward a tip portion of the annular elastic rib so that a cross section of the at least a second annular elastic rib portion is smaller in area at a tip portion thereof than at a base portion thereof.

13. The blood processing apparatus according to claim 8, wherein said blood processing apparatus is included in a hollow fiber type dialyzer.

14. The blood processing apparatus according to claim 8, wherein said annular elastic members are respectively conjoined to the entrance and exit blood ports by a two-color molding.

15. The blood processing apparatus according to claim 8, wherein said annular elastic ribs respectively have a tip surface that is flat.

16. The blood processing apparatus according to claim 8, wherein:

- the blood port has a shoulder portion defining the radially-outer side of said annular groove provided at the blood port; and said shoulder portion has a protrusion provided at an edge portion of a radially-inner side of said shoulder portion.

* * * * *